US005800264A

United States Patent [19]

Pascal et al.

[11] Patent Number: 5,800,264

[45] Date of Patent: Sep. 1, 1998

[54] METHOD AND APPARATUS FOR PROVIDING A SIGNAL INDICATING THE APPROXIMATE AMOUNT OF ELAPSED TIME

[75] Inventors: Andrew Pascal, Woodside; Louis David Giacalone, Jr., Palo Alto; Michael Barnett, Santa Clara, all of Calif.

[73] Assignee: Silicon Gaming, Inc., Palo Alto, Calif.

[21] Appl. No.: 692,454

[22] Filed: Aug. 5, 1996

[51] Int. Cl.[6] .................... G06F 3/00

[52] U.S. Cl. .................... 463/16; 307/139

[58] Field of Search .................... 463/16, 30, 31; 307/38, 41, 112, 116, 117, 139, 140, 141; 395/211

[56] References Cited

U.S. PATENT DOCUMENTS

| | | | |
|---|---|---|---|
| 4,701,849 | 10/1987 | Elden | 395/211 |
| 4,777,379 | 10/1988 | Young | 307/117 |
| 5,160,853 | 11/1992 | Simon et al. | 307/140 |

*Primary Examiner*—George Manuel

*Attorney, Agent, or Firm*—Claude A. S. Hamrick; Emil C. Chang; Oppenheimer W. Donnelly

[57] ABSTRACT

The present invention relates to a signaling system which provides as part of the signal an indication as to the approximate elapsed time since the activation of the signal. Furthermore, the type of service required can be indicated by a particular flashing scheme or color code. The system has both software and hardware components and can be easily integrated into individual game machines. In the preferred embodiment, the hardware component includes a software controllable switching means for controlling a plurality of lights. In order to identify the type of service needed, lights may be color-coded or different flashing patterns may be used. In the software component, a preferred algorithm which defines and varies the flash rate over time is implemented. The flash rate is defined as being in the on-state for a first specified duration and in the off-state for a second specified duration. Variables specifying the initial first and second specified durations, the final first and second specified durations, the amount of time to lapse before changing the first and second specified durations, and the amount of first and second specified durations to change are provided. These variables provide a great deal of flexibility in defining and manipulating the flash rate.

32 Claims, 3 Drawing Sheets

METHOD AND APPARATUS FOR PROVIDING A SIGNAL INDICATING THE APPROXIMATE AMOUNT OF ELAPSED TIME

BACKGROUND OF THE INVENTION

1. Field of the Invention

The present invention relates in general to signaling devices and, in particular, to a signaling system wherein the signal itself provides an indication as to the approximate amount of elapsed time since the signal was initiated.

2. Description of the Prior Art

On a large game floor where there may be a large number of machines such as slot machines or arcade game machines, individual machines may from time to time require service by floor service attendants in order to provide additional payout or to provide technical trouble-shooting assistance. In any case, there may be several machines requiring service calls at the same time. In order to provide the most expedient service to the patron who has waited the longest time, it would be desirable to have a signaling system indicating as part of the signal the approximate time elapsed since the activation of the signal. In this manner, the service attendants can prioritize the service calls and the patron who has been waiting the longest for service can be served first.

In a U.S. Pat. No. 4,701,849, an improved system for summoning service personnel to a particular location in a restaurant (or similar facility) and for monitoring their response time is disclosed. In this system, a switch at a customer's table is provided for activating a transmitter that generates a signal identifying the particular table. A central station having a plurality of receivers, each corresponding to a transmitter, is provided. The central station includes a display panel having individual sections designated therein corresponding to each of the tables. Each individual section includes a visual indicator, an audible annunciator, and a digital timer. When a table transmitter is activated, the corresponding receiver at the central station activates the visual indicator of the appropriate individual section to alert the service personnel. At the same time, the receiver also initiates a timer. Upon the timer reaching a first predetermined time period indicating that the customer may have waited too long, the audible annunciator is activated to alert the service personnel. The table transmitter is de-activated at the table when the service personnel reaches the table. In this system, there has to be a central station for monitoring each and every table (or game machine) . On a game floor with a large number of machines, this system is not cost effective and requires the attendant to return to the central station after every service call. Such system is time consuming and inefficient in general.

In another U.S. Pat. No. 5,382,940, an alarm system is disclosed for warning of the occurrence of an event at a particular island in an amusement arcade where a number of islands of game machines are installed, each island having one or two rows of game machines. The alarm system comprises a plurality of indicators on each island to indicate the occurrence of particular events, and a plurality of event detectors for each island to detect the occurrence of the events and activate corresponding indicators upon such detection. The indicators are disposed at both ends and an upper central portion of every row of the game machines in each island. In operation, the event detectors of each island detect the occurrence of an event and activate the corresponding indicators to notify an attendant. The occurrence of an event is detected through an input device such as a manual switch which generates a signal to the system when depressed by a player or a signal as generated by a game machine to indicate the need for a service call. In this system, the indicators do not provide any indication as to the relative elapsed time since the activation of the signal.

Thus, there is a need for a system for providing a signal that indicates the elapsed time since the time an annunciator was actuated in order to prioritize service calls on a large game floor with a large number of game machines. The system should be simple and readily integratable into game machine designs.

SUMMARY OF THE INVENTION

It is therefore an object of the present invention to provide a signaling system that provides as part of the signal an indication as to the elapsed time since the activation of the signal.

Another objective of the present invention is to provide a signaling system that can be easily integrated into a game machine.

Another object of the present invention is to provide a signaling system that provides as part of the signal an additional indication as to the type of service required.

Briefly, the present invention relates to a signaling system which provides as part of the signal an indication as to the approximate elapsed time since the activation of the signal. Furthermore, the type of service required can be indicated by a particular flashing scheme or color code. The system has both software and hardware components and can be easily integrated into individual game machines. In the preferred embodiment, the hardware component includes a software controllable switching means for controlling a plurality of lights. In order to identify the type of service needed, the lights may be color-coded or different flashing schemes may be used. For example, in the case where a player of a slot machine hits the jackpot, the machine will pay out only so many coins and the rest of the coins will have to be paid by a service attendant. In this case, the signaling system, integrated as part of the game machine, will be automatically activated by the internal programming of the slot machine. In another example, a patron of a game machine can manually activate the signaling system to call for a service attendant to handle a technical problem or a special request. In the two examples above, different colors of lights or flashing schemes may be used to identify the type of service call in addition to the change in flashing rate to indicate the approximate elapsed time.

In the software component of the preferred embodiment of the invention, a preferred algorithm which defines and varies the flash rate over time is implemented. The flash rate is defined as the indicators being in the on-state for a first specified duration and in the off-state for a second specified duration. Variables specifying the initial flash rate, the final flash rate, the amount of time to lapse before changing the flash rate, and the decrement of the flash rate are provided. These variables provide a great deal of flexibility in defining and manipulating the flash rate.

An important advantage of the present invention is that it provides, as part of the signal, an indication as to the relative elapsed time since the activation of the signal.

Another advantage of the present invention is that it provides a signaling system that can be easily integrated into a game machine.

Still another advantage of the present invention is that it provides a signaling system that provides as part of the signal an indication as to the type of service required.

These and other objects and advantages of the present invention will no doubt become apparent to those skilled in the art after having read the following detailed description of the preferred embodiment which is illustrated in the several figures of the drawing.

IN THE DRAWING

FIG. 1 is a block diagram illustrating an annunciator system in accordance with the present invention;

FIG. 2 graphically illustrates the behavior of the half period (which corresponds to the flash rate) over time in the preferred algorithm of the present invention;

DETAILED DESCRIPTION OF THE PREFERRED EMBODIMENT

Figure 1:
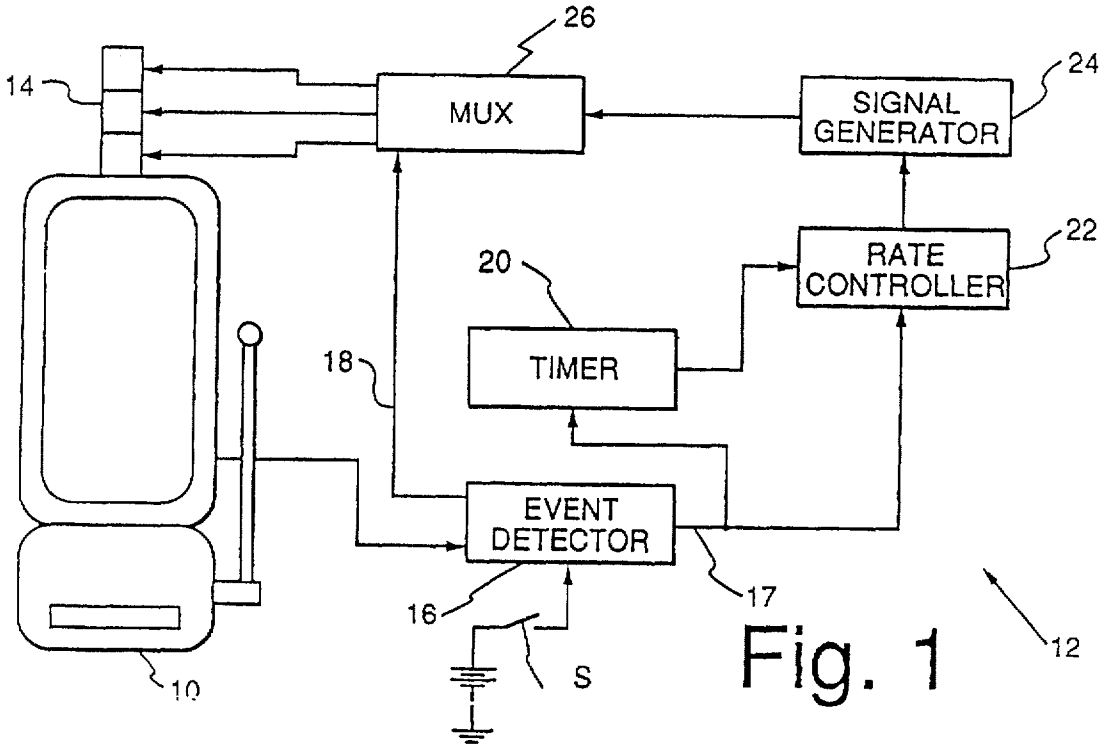

In FIG. 1 of the drawing, a simplified block diagram of an annunciator system of the type that might be used with a gaming unit (slot machine) 10 is depicted in the block diagram form at 12. Basically, the system includes an annunciator 14 that may be either a single stage device or a multiple stage indicator for providing either audio or visual annunciation. The illustrated device is a stacked three color visual indicator wherein each color or combination of colors is intended to have a particular meaning and significance relative to the operative state of unit 10.

The system includes one or more event detectors 16 which monitor operation of gaming unit 10, and upon sensing the occurrence of an event generates outputs on lines 17 and 18. Detector 16 may also be configured to respond to a manual input mode via a switch "S." The output on line 17 causes the timer 20 to be started and a rate controller 22 to be energized. Timer 20 then determines the time that has elapsed since the detected event has occurred and, once energized, rate controller 22 responds to the elapsed time input from timer 20 to control the nature of the signals to be developed by a signal generator 24. A multiplexer 26 responds to the signal developed by detector 16 on line 18 and routes the output of signal generator 24 to the appropriate indicator or indicators of the annunciator 14.

As will be described in more detail below, rate controller 22 is programmed to change the rate at which the output of generator 24 oscillates between an ON state and an OFF state as a function of time. It will then be appreciated that not only does the system indicates as a function of the indicator color or signaling pattern that a particular event has occurred; it also indicates, as a function of the rate of oscillation of the indicator, approximately how much time has elapsed since the event occurred.

Figure 2:
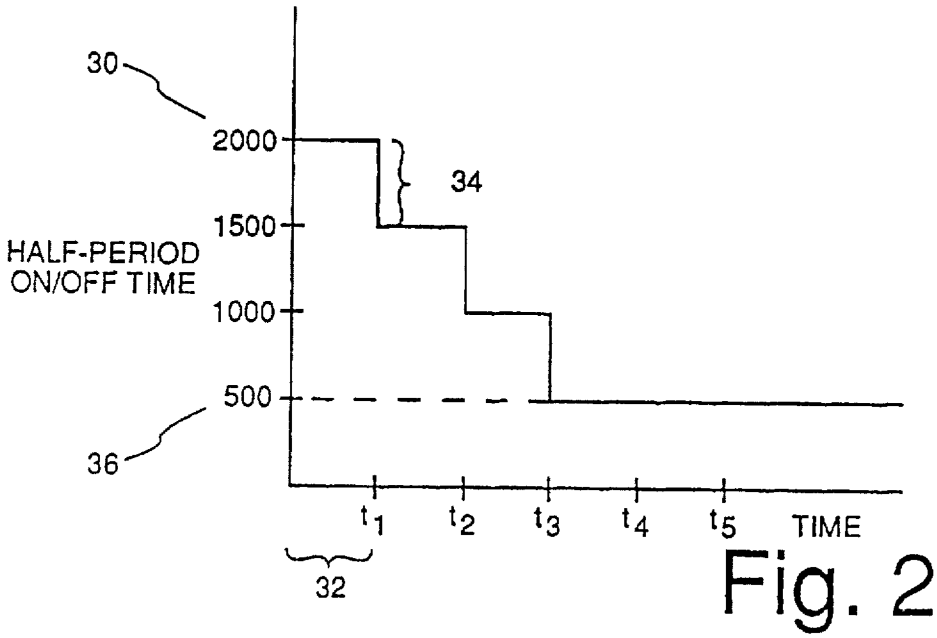

Referring to FIG. 2, a graphical illustration of the preferred algorithm of the present invention is disclosed. In this graph, units of time are provided on the horizontal axis and units of half period on/off time are provided on the vertical axis. The half period on/off time indicates the duration for the on-state (on-time) and the duration for the off-state (off-time) of the lights to be flashed. In this embodiment, the on-time and off-time are the same. When the half period on/off time decreases, the flashing rate increases. In other embodiments, the on-time can be as indicated by the vertical axis and the off-time can be a constant (or vice-versa or both can be variable).

The parameters of this algorithm are readily adjustable. The initial amount of on-time as indicated at 30 is provided by the variable OnTime. Over a preset interval (32) provided by the constant Time_Modifier, OnTime is decreased by an amount as provided by the constant, Rate_Modifier, which is shown at 34. This process continues until a minimum on-time, min_OnTime, is reached as is indicated at 36. When min_OnTime is reached, the flashing rate is flashing at the fastest allowable rate and this is a constant rate. With these four variables and constants provided, namely OnTime, Rate_Modifier, Time_Modifier, and min_OnTime, the preferred algorithm of the present invention can be made very flexible. Although Time_Modifier and Rate_Modifier are constants herein, they can be made to vary in accordance with a provided mathematical function.

Figure 3:
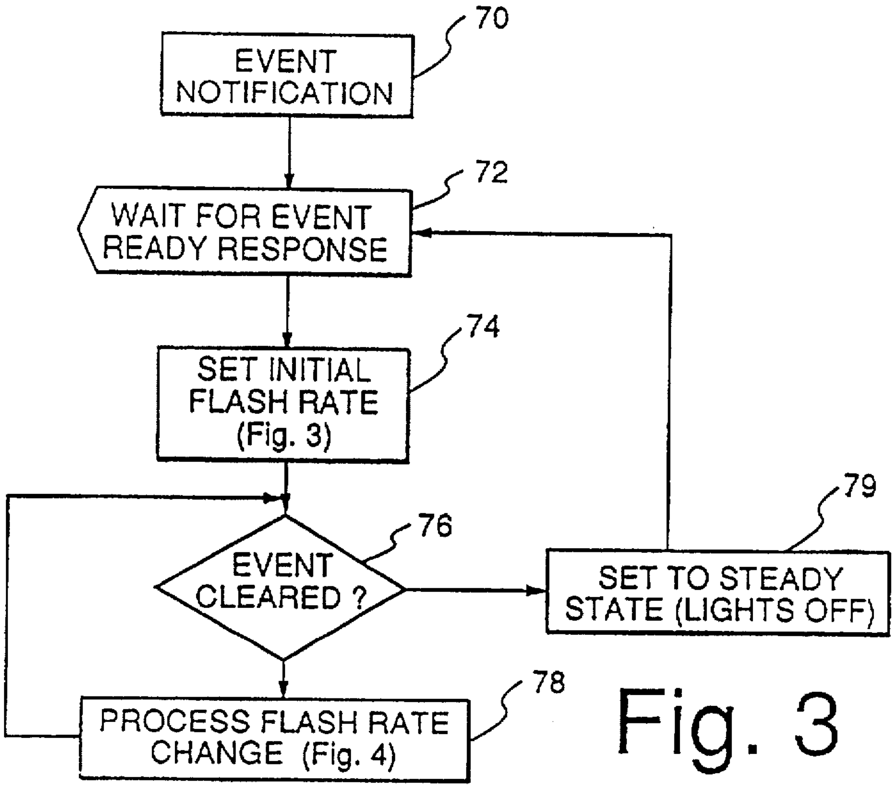
FIG. 3 illustrates a general process diagram showing the steps for carrying out the preferred embodiment of the present invention.
Figure 4:
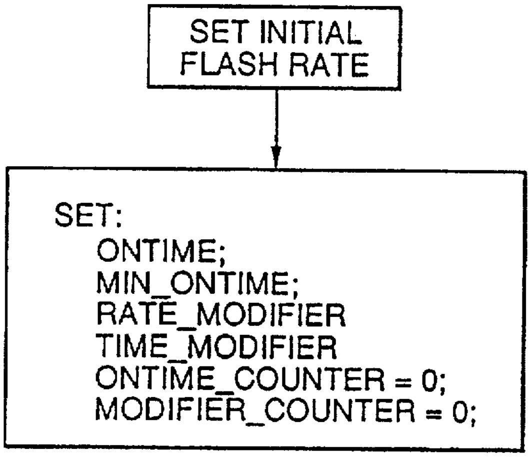
FIG. 4 illustrates the variables and constants initialized for the software aspects of the present invention.

Referring to FIG. 3, a general flow diagram is illustrated. The signaling system is activated by certain types of event notification signals 70 which can be a manually activated signal or automatically activated signals directly from a game machine. When an event signal is received as indicated at 72, the initial variables and constants for executing the preferred algorithm are initialized (74) . These variables and constants are further explained by FIG. 4. The next step (76) determines whether the signal that had triggered the signaling system has been cleared or not. If the event signal has not been cleared, the algorithm repeatedly processes the algorithm as is further illustrated in FIG. 5. If the event signal triggering the signaling system has been cleared, the process returns the signaling system to the steady state where the lights may be flashing (78) in a predetermined pattern, or may be OFF (79). As an option, there can also be an additional state referred to as the service-state. Service-state is designated as the state when the service-call is actually being serviced. During this time, the lights can stay ON without any flashes. When servicing is completed, the signaling system returns to the steady state.

In setting the initial flash rate variables and constants, (referring to FIG. 4), the variables initialized are OnTime, which is the initial half period on/off time; min_OnTime, which indicates the minimum half period on/off time; Time_Modifier which specifies the time to lapse before changing OnTime; and Rate_Modifier, which is the amount to decrease OnTime after every Time_Modifier period of time has elapsed. Two counters are initialized to zero, an OnTime_counter which tracks the amount of time elapsed since the lights were turned ON or turned OFF in order to provide the flashing effect, and a modifier_counter which tracks the amount of time elapsed since the last time the flash rate was changed (i.e. OnTime).

Figure 5:
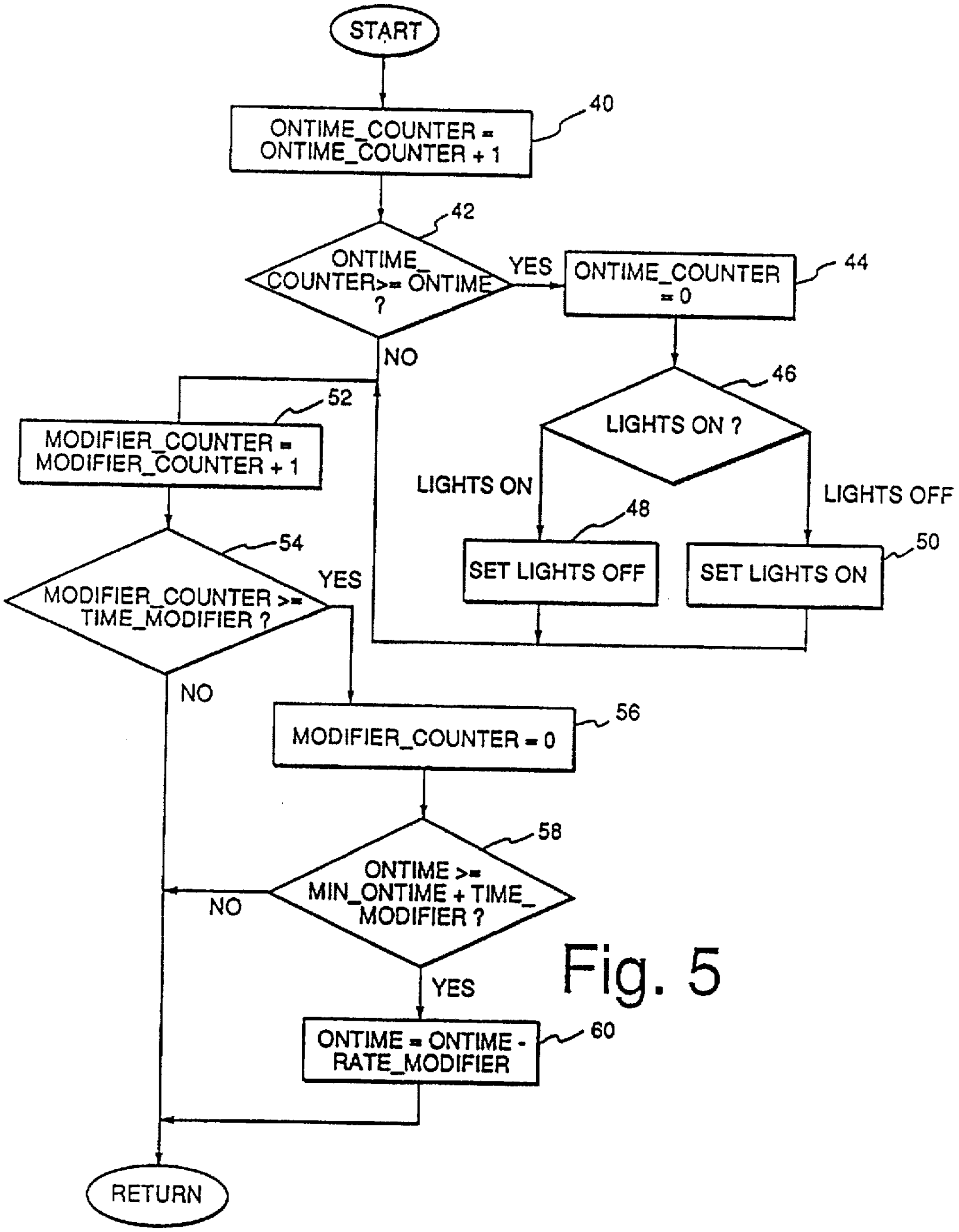
FIG. 5 shows the steps in modifying the flash rate of the preferred embodiment.

Referring to FIG. 5, an algorithm in accordance with the preferred embodiment of the present invention is illustrated. Operation of the algorithm is started by incrementing the OnTime_counter by 1 count as indicated by block 40. A single count is a single time click indicating a predetermined amount of elapsed time. It can correspond to 1 second or a tenth of a second. The exact time is implementation dependent. Note that all of the time related variables and constants provided herein are set forth in such a manner that the times elapsed are relative to each other. If the OnTime_counter is greater than or equal to the OnTime as determined at 42, the lights need to be changed from one state to another, namely from OFF to ON, or from ON to OFF in order to provide the flashing effect. In this event, the OnTime_counter is initialized to zero (44). In response, and as indicated at 46, the lights are turned OFF (48) if the lights were originally in the ON state; otherwise the lights are turned ON (50) if the lights were originally in the OFF state. In the next step (52), the modifier_counter is increased by one count which tracks the amount of time elapsed since the last time the half period (flash rate) was decreased. If, as determined at 54, modifier_counter is equal to or greater than that of the time_modifier, which is the time period to elapse before the flash rate is increased, modifier_counter will be re-initialized. Moreover, if, as depicted at 58, the OnTime is greater than or equals the minimum on-time (min_OnTime) plus Time_Modifier, indicating that the minimum flash rate has not been reached yet, the current flash rate (OnTime) is decreased by a specified amount as indicated at 60 by the constant Rate_Modifier. At the end of this step or if modifier_counter is not greater than or equal to Time_Modifier, the process returns to the calling routine (FIG. 2, block 28).

Note that other flashing schemes can be readily incorporated into the preferred algorithm; for example, a flashing scheme where the lights are ON for 300 ms, OFF for 300 ms, ON for 300 ms, pause 1 second, and repeat. In this example, there are two flashes and the duration of the ON-state and OFF-state can decrease over time. Other schemes such as three or more flashes are within the scope of the present invention as well.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A signaling system for providing a visual notification in response to the occurrence of one or more predetermined events, comprising, means for generating a control signal upon the occurrence of one of said predetermined events;

indicator means for providing a visually observable signal, said indicator means having an ON-state and an OFF-state; and controller means responsive to said control signal and having preprogrammed instructions and data for operating said indicator means to repeatedly alternate between said ON-state for a first specified duration and said OFF-state for a second specified duration in response to a signal representing a single event, wherein said first specified duration and said second specified duration change in duration over time.

2. A signaling system as recited in claim 1 wherein said first specified duration is the same as the second specified duration.

3. A signaling system as recited in claim 2 wherein said first specified duration and said second specified duration decrease by a designated value after every specified period of time.

4. A signaling system as recited in claim 3 wherein said first specified duration and said second specified duration cease decreasing after reaching a particular duration.

5. A signaling system as recited in claim 4 wherein said means for generating a control signal includes an automatic event detector.

6. A signaling system as recited in claim 4 wherein said means for generating a control signal includes a manually operated switch.

7. A signaling system as recited in claim 1 wherein said first specified duration decreases by a designated value after a specified period of time.

8. A signaling system as recited in claim 1 wherein said second specified duration decreases by a designated value after a specified period of time.

9. A signaling system as recited in claim 1 wherein said first specified duration and said second specified duration each ceases changing after reaching a particular duration.

10. A signaling method for providing visual notification of the occurrence of an event, comprising the steps of:

generating and maintaining a control signal upon detecting the activation of one of a plurality of events;

initializing the initial values for a set of parameters for operating an indicator means, said indicator means operating between an on-state for a first specified duration and an off-state for a second specified duration;

determining if said control signal is still active;

if said control signal is still active, determining the first specified duration and said second specified duration as a function of time and operating said indicator means according to the determined first and second specified duration; and if said control signal is not active, operating said indicator means at a steady rate.

11. A signaling method as recited in claim 10 wherein said parameters include a value for the first specified duration, a value for the second specified duration, a first rate-modifier value for changing the first specified duration, a second rate-modifier value for changing the second specified duration, a first time-modifier value designating the time period to lapse before changing the first specified duration, and a second time-modifier value designating the time period to lapse before changing the second specified duration.

12. A signaling method as recited in claim 11 wherein said first specified duration is the same as the second specified duration.

13. A signaling method as recited in claim 12 wherein said first specified duration and said second specified duration decrease by said first rate-modifier value and said second rate-modifier value respectively after said first time-modifier value and said second time-modifier value have respectively been reached.

14. A signaling method as recited in claim 13 wherein said first specified duration and said second specified duration cease decreasing after reaching a particular duration.

15. A signaling method as recited in claim 14 wherein the activation in the generating and maintaining step includes activation by an automatic event detector.

16. A signaling method as recited in claim 14 wherein the activation in the generating and maintaining step includes activation by a manually operated switch.

17. A signaling method as recited in claim 11 wherein said first specified duration changes by said first rate-modifier value after said first time-modifier value has been reached.

18. A signaling method as recited in claim 11 wherein said second specified duration changes by said second rate-modifier value after said second time-modifier value has been reached.

19. A signaling method as recited in claim 11 wherein said first specified duration and said second specified duration each ceases changing after reaching a particular duration.

20. A signaling method as recited in claim 10 wherein the activation in the generating and maintaining step includes activation by an automatic event detector.

21. A signaling method as recited in claim 10 wherein the activation in the generating and maintaining step includes activation by a manually operated switch.

22. In an electronic gaming apparatus of the type having a signaling means operating one or more indicator means disposed on a housing of said electronic gaming apparatus, said indicator means providing visually observable signals to game floor attendants indicating that an event requiring service has occurred and the approximate time elapsed since the occurrence of the event, an improved signaling means comprising:

means for generating a control signal upon the occurrence of one of said predetermined events;

indicator means for providing a visually observable signal, said indicator means having an ON-state and an OFF-state; and controller means responsive to said control signal and having preprogrammed instructions and data for operating said indicator means to change between said ON-state for a first specified duration and said OFF-state for a second specified duration in response to a signal representing a single event, wherein said first specified duration and said second specified duration change in duration over time.

23. An improved signaling means as recited in claim 22 wherein said first specified duration is the same as the second specified duration.

24. An improved signaling means as recited in claim 23 wherein said first specified duration and said second specified duration decrease by a designated value after every specified period of time.

25. An improved signaling means as recited in claim 24 wherein said first specified duration and said second specified duration cease decreasing after reaching a particular duration.

26. An improved signaling means as recited in claim 25 wherein said means for generating a control signal includes an automatic event detector.

27. An improved signaling means as recited in claim 26 wherein said means for generating a control signal includes a manually operated switch.

28. A signaling system as recited in claim 22 wherein said first specified duration decreases by a designated value after a specified period of time.

29. A signaling system as recited in claim 22 wherein said second specified duration decreases by a designated value after a specified period of time.

30. A signaling system as recited in claim 22 wherein said first specified duration and said second specified duration each ceases changing after reaching a particular duration.

31. An improved signaling means as recited in claim 22 wherein said means for generating a control signal includes an automatic event detector.

32. An improved signaling means as recited in claim 22 wherein said means for generating a control signal includes a manually operated switch.

* * * * *